US008260002B2

(12) United States Patent
Almbladh

(10) Patent No.: US 8,260,002 B2
(45) Date of Patent: Sep. 4, 2012

(54) VIDEO ANALYTICS SYSTEM, COMPUTER PROGRAM PRODUCT, AND ASSOCIATED METHODOLOGY FOR EFFICIENTLY USING SIMD OPERATIONS

(75) Inventor: Johan Almbladh, Lund (SE)

(73) Assignee: Axis AB, Lund (SE)

( * ) Notice: Subject to any disclaimer, the term of this patent is extended or adjusted under 35 U.S.C. 154(b) by 950 days.

(21) Appl. No.: 12/275,832

(22) Filed: Nov. 21, 2008

(65) Prior Publication Data

US 2010/0080483 A1 Apr. 1, 2010

Related U.S. Application Data

(60) Provisional application No. 61/100,575, filed on Sep. 26, 2008.

(51) Int. Cl.
*G06K 9/00* (2006.01)
(52) U.S. Cl. .......................... 382/107; 382/232
(58) Field of Classification Search .................. 382/103, 382/104, 105, 107
See application file for complete search history.

(56) References Cited

U.S. PATENT DOCUMENTS 6,825,857 B2 * 11/2004 Harasimiuk ................. 345/660
7,505,946 B2 * 3/2009 Chellapilla et al. ............ 706/11
7,529,423 B2 * 5/2009 Aldrich et al. ................ 382/272
7,715,591 B2 * 5/2010 Owechko et al. ............. 382/104

FOREIGN PATENT DOCUMENTS

WO WO 93/16442 8/1993
WO WO 2005/106786 A1 11/2005

OTHER PUBLICATIONS

"Processing Binary Images", Taylor & Francis Group, LLC, Chapter 8, XP 009128706, 2007, 68 pages.
Sylvia Gil, et al., "Feature selection for object tracking in traffic scenes", Intelligent Vehicle Highway Systems, vol. 2344, XP 000689133, 1994, pp. 253-266.
Sanjay Ranka, et al., "Massive Parallelism for Sparse Images", IEEE, XP 10054742, 1991, pp. 683-688.
"Intel C++ Compiler for Linux Systems User's Guide", Intel Corporation, 2004, http://www.intel.com/software/products/compilers/clin/docs/ug_cpp/, 635 pages.
"AltiVec Instruction Cross-Reference", Apple Inc., 2005,—http://developer.apple.com/hardwaredrivers/ve/instruction_crossref.html, 9 pages.

(Continued)

Primary Examiner — Tom Y Lu
(74) Attorney, Agent, or Firm — Oblon, Spivak, McClelland, Maier & Neustadt, L.L.P.

(57) ABSTRACT

A video analytics system and associated methodology for performing low-level video analytics processing divides the processing into three phases in order to efficiently use SIMD instructions of many modern data processors. In the first phase, pixels of interest are gathered using a predetermined mask and placed into a pixel matrix. In the second phase, video analytics processing is performed on the pixel matrix, and in the third phase the pixels are scattered using the same predetermined mask. This allows many pixels to be processed simultaneously, increasing overall performance. A DMA unit may also be used to offload the processor during the gathering and scattering of pixels, further increasing performance. A network camera integrates the video analytics system to reduce network traffic.

15 Claims, 11 Drawing Sheets

OTHER PUBLICATIONS

"ARM1136JF-S and ARM1136J-S Technical Reference Manual", ARM Ltd., 2006, http://infocenter.arm.com, 844 pages.

"MIPS32 Architecture for Programmers vol. IV-E: The MIPS DSP Application-Specific Extension to the MIPS32 Architecture", MIPS Technologies, Inc., Jan. 6. 2009, http://www.mips.com, 231 pages.

Hank Dietz, "Technical Summary: SWAR Technology", 1997, http://cobweb.ecn.purdue.edu/~hankd/SWAR/over.html, 6 pages.

"Implementing SIMD in Software", Berkley Design Technology, Inc. (BDTI), Dec. 6, 2006, http://www.insidedsp.com/Articles/tabid/64/articleType/ArticleView/articleId/173/Implementing-SIMD-In-Software.aspx, 8 pages.

* cited by examiner

VIDEO ANALYTICS SYSTEM, COMPUTER PROGRAM PRODUCT, AND ASSOCIATED METHODOLOGY FOR EFFICIENTLY USING SIMD OPERATIONS

CROSS-REFERENCE TO RELATED APPLICATION

This application contains subject matter related to co-pending U.S. patent application Ser. No. 12/275,758, entitled "Apparatus and Associated Methodology for Video Analytics", filed on even date herewith, the entire contents of which are incorporated herein by reference.

This application also claims the benefit of the earlier filing date of U.S. Provisional Application Ser. No. 61/100,575, entitled "Video Analytics System, Computer Program Product, and Associated Methodology for Efficiently Using SIMD Operations", filed on Sep. 26, 2008, the entire contents of which is incorporated herein by reference.

BACKGROUND

1. Field of the Invention

The present disclosure concerns a processing system for efficiently performing video analytics operations. More specifically, this disclosure describes a system, computer program product, and associated methodology for gathering individual image pixels, selected for video analytics processing, and arranging the gathered pixels in a single pixel matrix on which Single Instructions Multiple Data (SIMD) operations are performed. This significantly reduces processing demands placed on the Central Processing Unit (CPU) processing the image.

The present disclosure also described a network camera that performs video analytics, such as motion detection, and reduces the amount of video data transferred over a network.

2. Discussion of the Background

Video analytics or video content analysis range from video motion detection and audio detection, to more advanced systems including camera tampering detection, people counting, detection of objects crossing lines or areas of interest, vehicle license plate recognition, segmentation of video into foreground and background portions, tracking objects, traffic analysis, meta data extraction, biometric applications, and facial recognition. Video analytics also makes surveillance systems more intelligent to reduce vast amounts of image data to manageable levels. Intelligent video surveillance systems can for example automatically analyze and tag surveillance video in real-time, detect suspicious activities, initiate video recording, activate alarms or other actions to alert operators or other personnel.

In surveillance applications, video analytics is often used to detect motion. Motion detection is a way of defining activity in a scene by analyzing image data, and may be performed on a surveillance camera's entire field of view or on a user-defined area of interest. Furthermore, a video surveillance system with motion detection capabilities is able to detect motion more reliably than a human operator, and is therefore able to free human operators from staring at multiple video monitors for long hours. Instead, the video surveillance system with motion detection capabilities is able to alert the operator using a visual indicator, an audio indicator or both when motion is detected. Such a surveillance system may also automatically focus a surveillance camera on the area where motion was detected to obtain a more detailed image.

As recognized by the present inventor, a network camera capable of performing video analytics would reduce the work load of a centralized image processing system, and conserve valuable network bandwidth. Such a network camera would allow true event-driven surveillance systems where detection of motion by the camera could trigger predefined automatic processes, such as adjusting temperature, activating alarms, locking/unlocking doors, etc.

However, because video analytics frequently entails performing several relatively simple operations on large amounts of pixel data, current methods do not lend themselves to mobile or embedded applications, such as a network camera. Conventional methods of quickly reducing the amount of data (number of pixels) processed during video analytics have been developed to reduce CPU processing burdens.

One such conventional method sequentially steps through all of the pixels in an image to identify pixels that are of interest. If the pixel is not of interest, the method moves to the next pixel for analysis. In this context, "of interest" signifies that the pixel contains information relevant to the analysis being conducted, for example motion information. If the pixel is of interest, the method performs the relevant operations on the pixel before moving on to the next pixel. Thus, this method nests the video analytics processing of a pixel within the routine that identifies pixels of interest. In the case of a filter, for example, while the filter is selectively applied only to pixels of interest, the filter is still applied to only one pixel of interest at a time.

Many modern processors are capable of performing Single Instruction, Multiple Data (SIMD) instructions in order to process multiple data fields in parallel, and increase performance. In processors with SIMD instruction capability, each register is divided into at least two fields. Each field represents data that is independent of data in other fields. For example, in a video analytics context, each field may represent an individual pixel. As the processor is able to execute a SIMD instruction on an entire register, the pixels contained in the fields of the register are processed simultaneously. Thus, performance of a SIMD-capable processor may be significantly better than the performance of a general-purpose processor.

However, as recognized by the present inventor, the above-described conventional method of selecting pixels to be processed is not well suited for SIMD instruction processing. Because the method nests the video analytics processing within the pixel selection routine, a SIMD-capable processor is forced to process selected pixels one at a time in much the same way as a general-purpose processor, thereby negating the advantages gained by employing SIMD instructions.

A result of the above-described inefficiencies of conventional video analytics is that powerful computer systems having high processing capacities are still preferred for performing video analytics functions, such as filtering and motion detection. Therefore, these methods are not well suited for local implementation of video analytics in network cameras.

A typical video surveillance system includes multiple video surveillance cameras connected to a central processing unit by a network, such as an IP-based network. Often the IP-based network is not exclusively devoted to the video surveillance system, but is shared with other network-based application, such as email, web browsing, database systems, and the like. In the case where the video surveillance system employs conventional video analytics performed by the central processing unit, each camera must provide a raw video image stream to the central processing unit. This places an enormous amount of video data on the network with large amounts of data traffic, requiring bandwidth that might otherwise be used by other network application.

SUMMARY OF THE INVENTION

The present disclosure provides a system, computer program product, and associated methodology, for selecting pixels of interest from an image, suitable for SIMD-capable processors, thereby solving the aforementioned deficiencies in the art.

An exemplary system for video analytics processing according to the present invention includes a pixel gathering unit that gathers a plurality of pixels of interest, from an image, by using a predetermined binary mask. The predetermined binary mask is used to define the location of the pixels of interest on the image. An electronic memory stores the pixels of interest as a pixel matrix that contains only pixels of interest arranged adjacently therein. A data processor performs video analytics processing on the pixel matrix, independently of the pixel gathering unit, and a pixel scattering unit scatters the processed pixels back into the image according to the predetermined mask.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The present disclosure describes a preferred embodiment by referring to the accompanying drawings.

Figure 1:
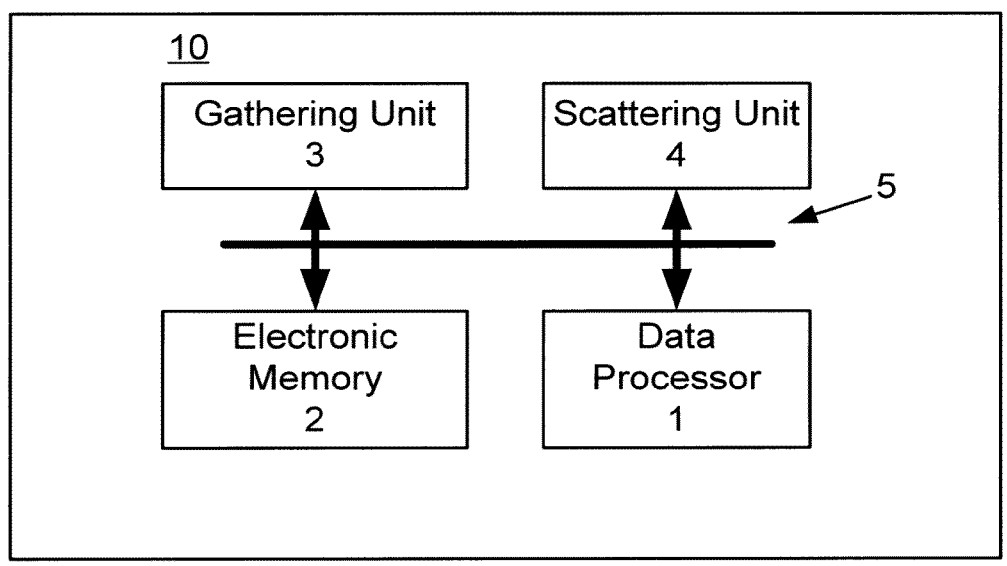
FIG. 1 is a schematic diagram of a video analytics system according to an exemplary embodiment of the present disclosure.
Figure 2:
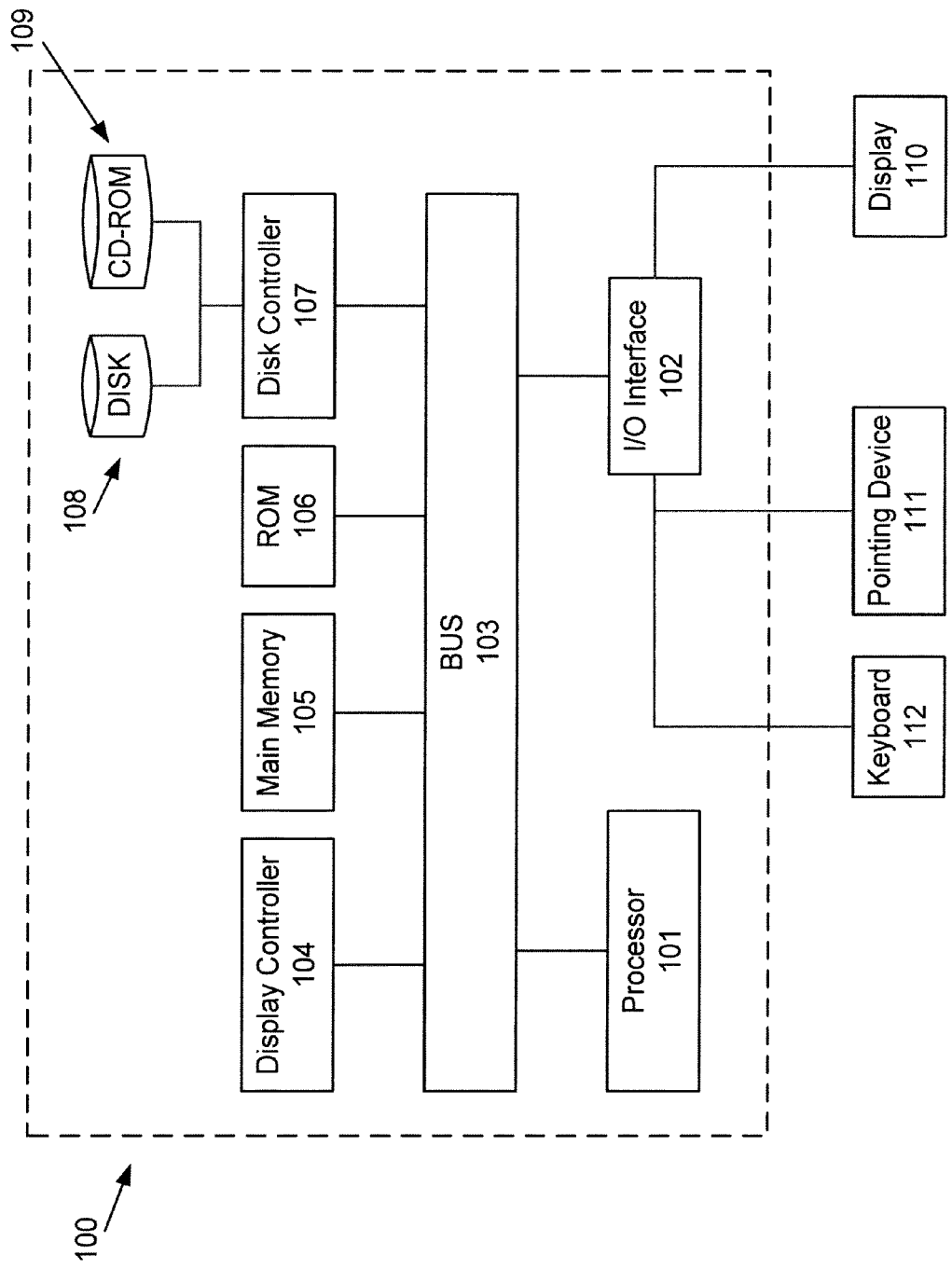
FIG. 2 is a schematic diagram of a computer system on which a video analytics method according to an exemplary embodiment of the present disclosure is executed.

FIG. 1 is a diagram of a video analytics system according to an exemplary embodiment of the present disclosure. The system includes a gathering unit 3 for gathering pixels of interest, a scattering unit 4 for scattering the pixels of interest once processing is complete, an electronic memory 2 for storing the pixels of interest, and a data processor 1 for performing the video analytics processing. All of the above-mentioned components are interconnected by a databus 5.

The video analytics processing system may be implemented on a personal computing device, such as a PC employing a Pentium processor. The instruction set of the gathering unit 3 and scattering unit 4 may be provided as a utility application, background daemon or component of an operating system, or combination thereof executing in conjunction with a processor and operating system such as Microsoft VISTA®, Unix, Solaris, Linux, Apple MAC-OS and other systems known to those skilled in the art.

The electronic memory 3 may be dynamic or static random access memory (RAM) integral to the PC, or may be other memory devices such as FLASH, EEPROM, optical disk, servers, and the like. The memory may also be detachable from the video analytics processing system.

The video analytics processing system may also be implemented on hardware devices such as FPGA's, ASIC's, microcontrollers, PLD's or other such devices known in the art.

Figure 3:
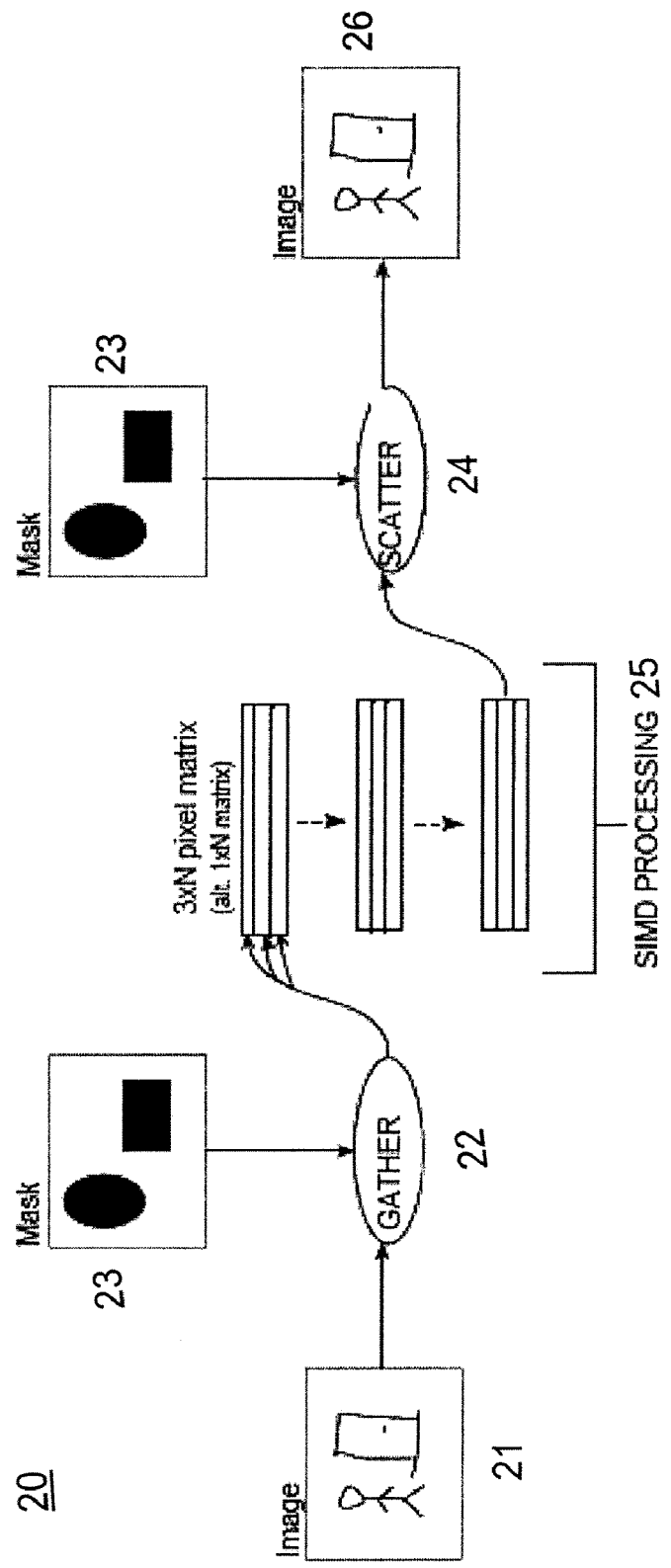
FIG. 3 is a schematic diagram of a video analytics method according to an exemplary embodiment of the present disclosure.

FIG. 3 depicts the video analytics processing method according to an exemplary embodiment of the disclosure. The video analytics processing method has three phases: gathering pixels, processing pixels and scattering pixels. In the gathering phase 22, a binary mask 23 is used to gather pixels selected for video analytics processing from an image 21. The binary mask 23 is a bitmap that defines the pixel positions of the pixels of interest using ones and zeros. Each pixel is represented by a single bit in the binary mask 23. A bit having value of one defines a pixel selected for processing (i.e. a pixel "of interest") and a bit having value of zero defines a pixel not selected for processing. However, the reverse case may also be used with the present disclosure, namely a pixel of interest may be denoted by a zero value and a pixel that may be not to be processed is denoted by a value of one.

Figure 4:
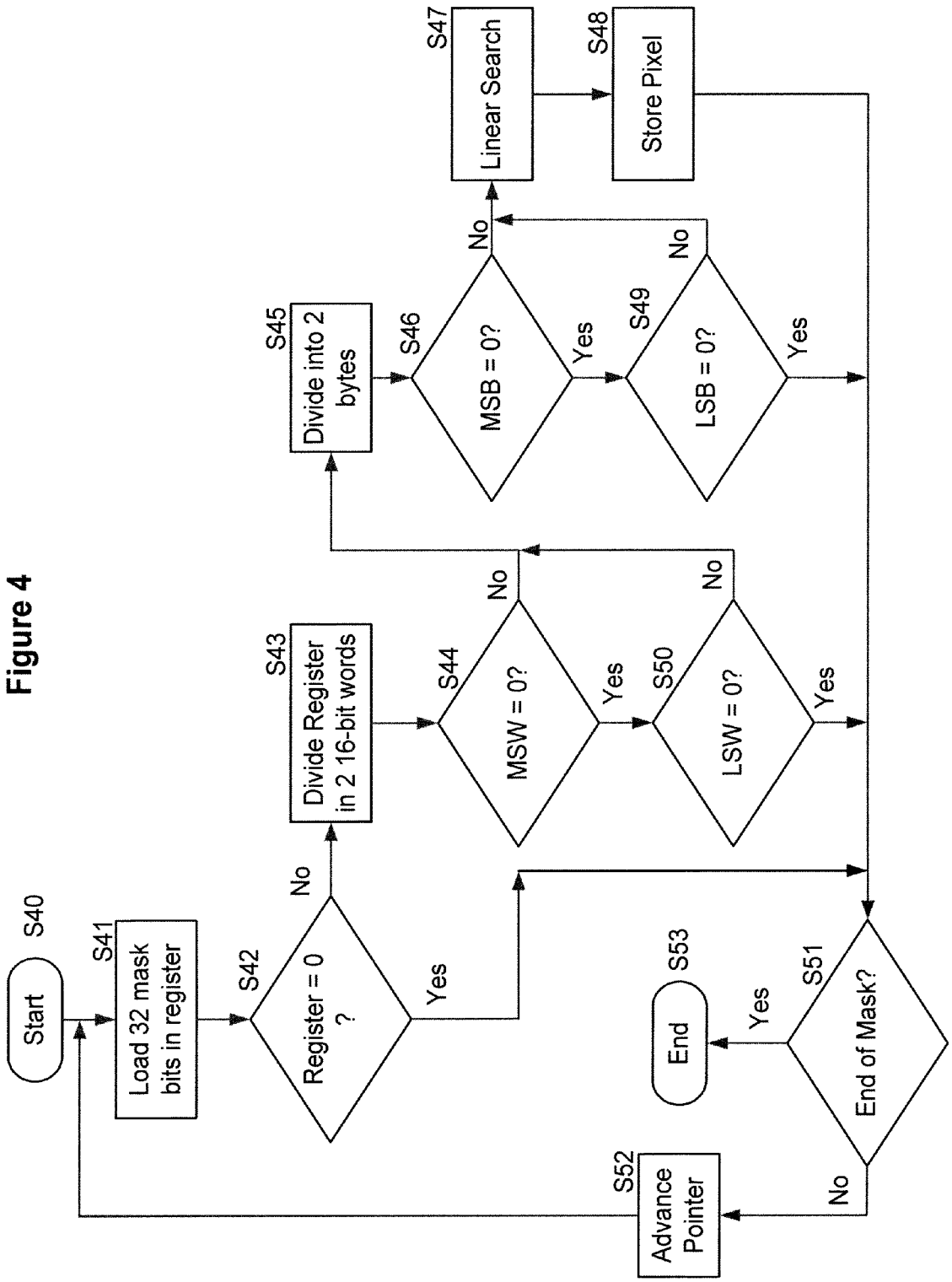
FIG. 4 is a flowchart of binary mask application according to an exemplary embodiment of the present disclosure.

Identifying pixels of interest using the binary mask 23 is very efficient since several pixel positions of the binary mask may be tested simultaneously. FIG. 4 is a flowchart of the application of the binary mask to an image. In this example, a 32-bit register is used, but this process may be used with registers of any length. The process begins at step S40. A register is loaded with 32 binary mask bits corresponding to 32 image pixels at step S41. At step S42, the register is compared to zero, as in this example a zero value defines a pixel not selected for processing. If the register is equal to zero the process continues to step S51 to determine whether the end of the mask has been reached. If the end of the mask has been reached, the process ends at step S53.

However, if there are more mask bits, and therefore pixels, to process, a pointer determining the block of 32 mask bits being examined is advanced by 32 at S52, and the process returns to step S41 to load a new set of 32 mask bits into the register. If the register is not equal to zero at S42, the register is divided into two 16-bit words, a Most Significant Word (MSW) and a Least Significant Word (LSW), at S43. At S44 the MSW is compared to zero. If the MSW is not equal to zero, it is divided into two 8-bit bytes, a Most Significant Byte (MSB) and a Least Significant Byte (LSB), at S45. At S46, the MSB is compared to zero, and if the MSB is not equal to zero, it is linearly searched to identify the non-zero bits at S47. Then a similar series of steps are executed for the LSB at S49 and S47. The non-zero pixels are stored at S48 as "pixels of interest" before reverting to S51.

A similar process is executed for the LSW, beginning with step S50. Once all of the pixels of interest are gathered, and the end of the mask is reached, the process ends at S53.

While in the above example, only two levels of division are used, (i.e. from 32 bits to 16 bits and from 16 bits to 8 bits) additional division levels are possible, or fewer levels of division may be used. Alternatively, the register may be searched linearly directly without performing any division. In this context, division signifies creating two groups of pixels, equal in number of pixels, from a larger group of pixels. For example, a first level of division of a group of 8 bits forms two groups of 4 bits, and so on.

In the above-described pixel gathering, the pixels of interest defined by the binary mask 23 are gathered in a predefined order into an array for further processing. For example, the pixels may be gathered from left to right into a one-dimensional array. However, the information regarding neighboring pixels is lost in the vertical direction, and in the horizontal direction for pixels at the boundary of an area being gathered. Many video analytics operations require such neighboring information, and therefore require gathering additional, neighboring pixels adjacent to the pixels of interest. These operations include, for example, Sobel gradient filters (see application Ser. No. 12/275,758.) Gathering the additional pixels in the horizontal direction is efficiently accomplished through morphological dilation of the binary mask 23 in the horizontal direction to include the neighboring pixels.

In the case of morphological dilation in the vertical direction, three gathering passes are performed: one pass for the horizontally dilated mask translated one row above its original position; another pass in its original position; and a last pass one pixel row below its original position. This generates a 3×N array. The pixels of interest now have their respective neighboring pixels from the original image at the same relative positions in the array. Padding pixels are added as neighboring pixels to those pixels of interest situated along a boundary.

Figure 5:
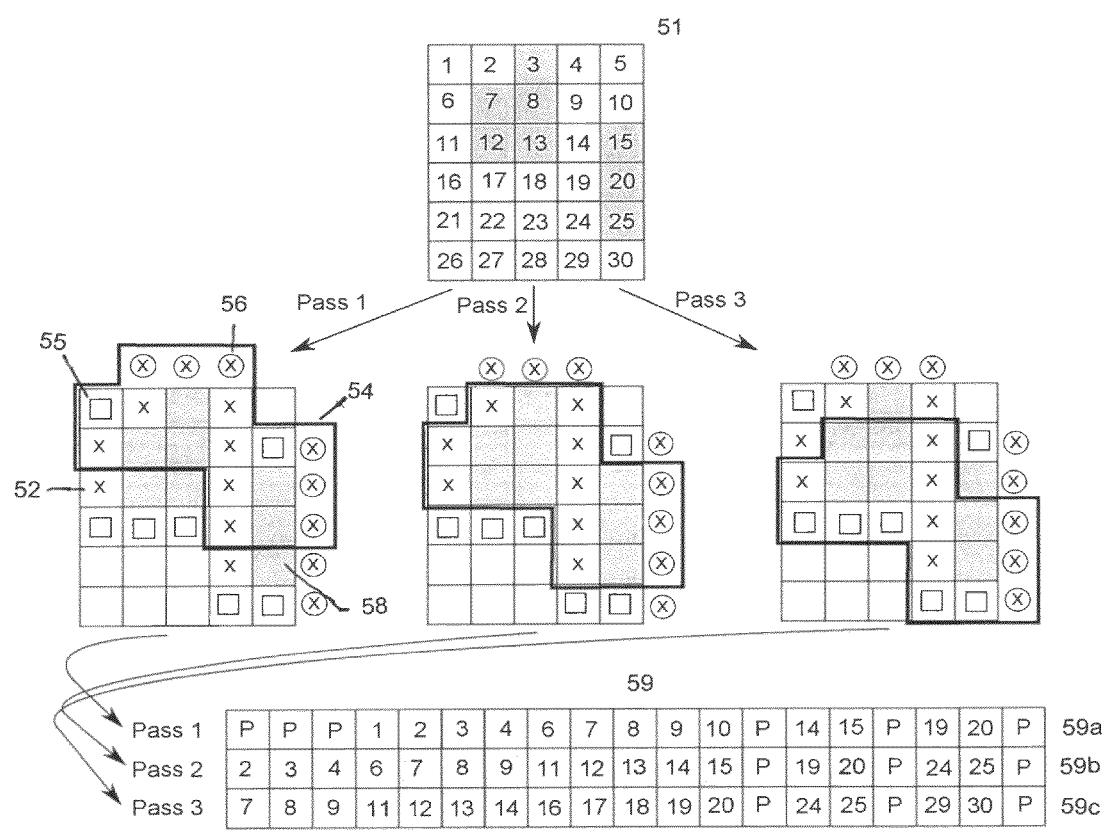
FIG. 5 is a schematic diagram of morphological dilation and application of the binary mask according to an exemplary embodiment of the present disclosure.

FIG. 5 is a simplified example of the gathering process described above. The pixels of interest 58 are in grey, the pixels 52 marked by an "X" are pixels gathered as a result of morphological dilation, the pixels marked with an "X" inside a circle are padded pixels 56, and the pixels marked with a box show additional neighboring pixels 55 in a vertical direction. FIG. 5 also includes the resulting array 59 wherein the pixels of interest 58 gathered on the second pass are shown in relation to their closest neighbors. Other methods are also possible without departing from the scope of the present disclosure. For example, the pixels may be gathered in a single gathering pass.

Figure 6:
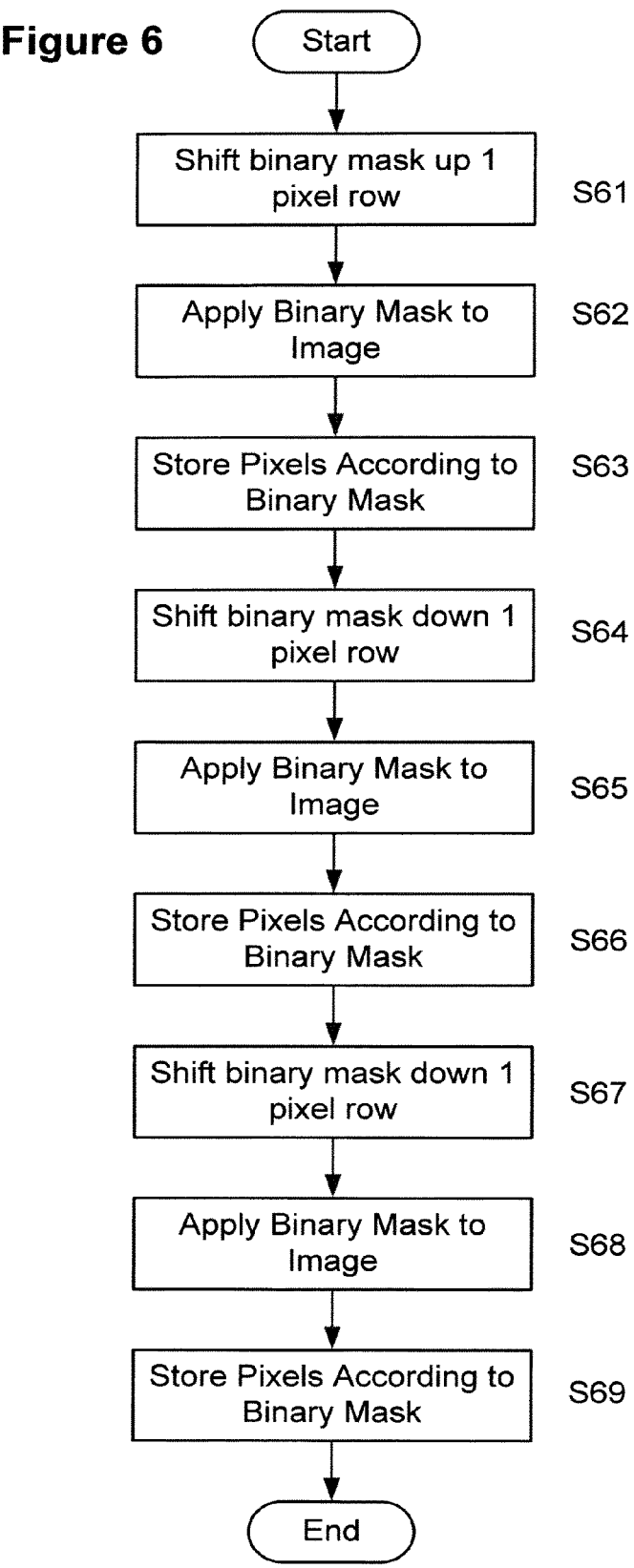
FIG. 6 is a flowchart of morphological dilation according to an exemplary embodiment of the present disclosure.

FIG. 6 is a flowchart of the application of binary mask 54 to an image according to an exemplary embodiment of the disclosure. At step S61, the binary mask 54 (see FIG. 5) is shifted up by one pixel row to gather the vertical neighbors above the pixels of interest 58. Then, the binary mask 54 is applied to the image 51 at S62, and the corresponding pixels are stored in the top row 59a of the array 59 at step S63. The binary mask is shifted back to its original position at step S64 in order to gather the pixels of interest 58 and their respective horizontal neighbors. At step S65 the binary mask 54 is applied to the image 51 as described above, and the corresponding pixels are stored in the second row 59b of the array 59 at step S66. The binary mask 54 is then shifted down by one pixel row in order to gather the vertical neighbors below the pixels of interest 58. The binary mask 54 is applied at step S68 and the pixels are stored in the third row 59c of the array 59 at step S69.

It should be noted that any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Gathering the pixels in an 3×N pixel matrix, as described above, enables the efficient use of SIMD instructions because the pixel matrix contains only a few of the pixels of the original image. A SIMD instruction applied to a row or column of the pixel matrix processes multiple pixels of interest simultaneously, unlike conventional methods that process one pixel of interest at a time. Examples of SIMD instructions performed on the 3×N pixel matrix include a splice instruction, a doubled absolute value instruction, an averaging instruction having a rounded result, an averaging instruction having a truncated instruction, and linear interpolation instruction having a result rounded towards a predetermined number.

Figure 7:
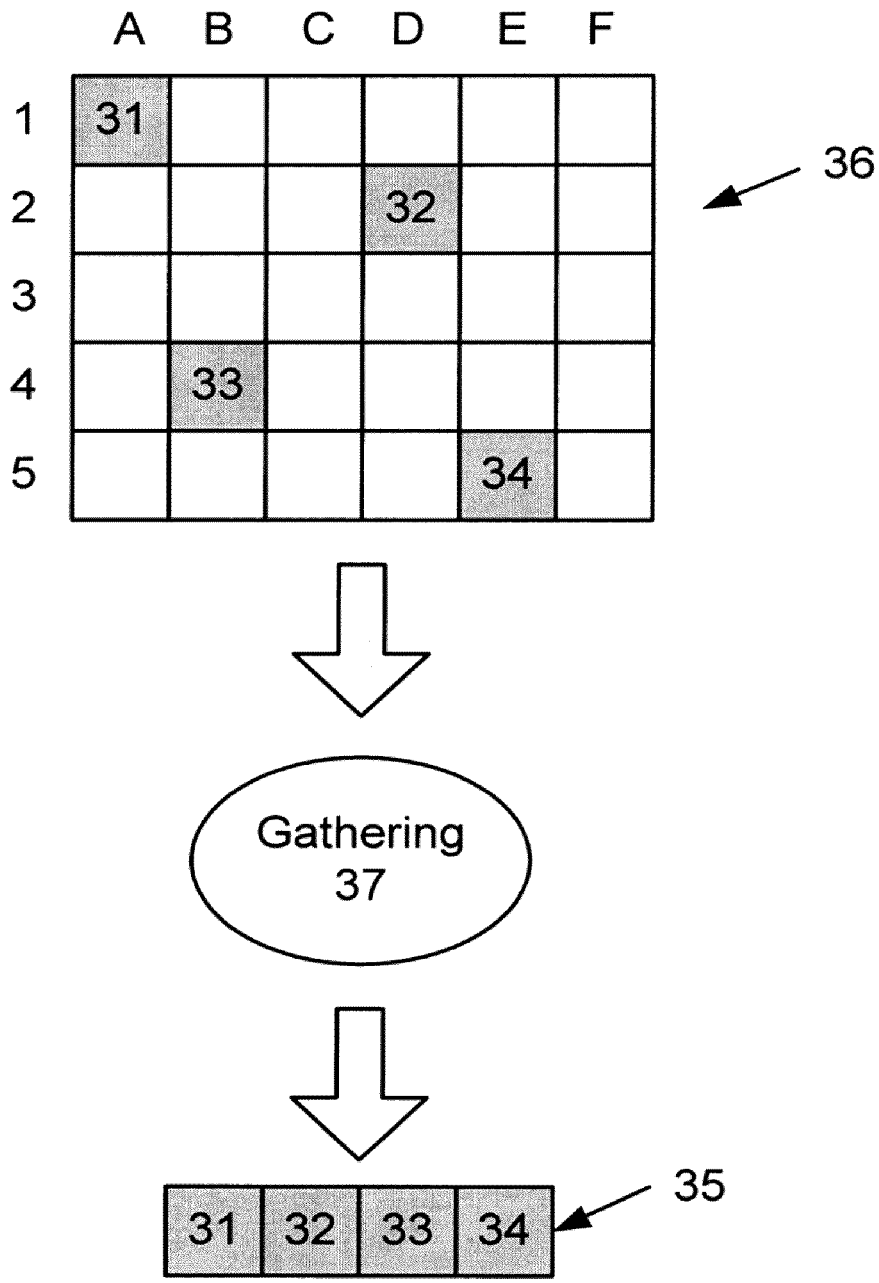
FIG. 7 is a diagram of pixel gathering according to an embodiment of the present disclosure.

Referring to FIG. 7, an image 36 is composed of a large amount of pixels corresponding to pixel positions (X, Y), wherein X defines the row position of the pixel (A to F) and Y defines the column position (1 to 5). However, only certain pixels in the image are determined to be pixels of interest (31 to 34). In image 36, the pixels of interest (31 to 34) are spread apart, not adjacent. During pixel gathering, the pixel matrix 35 is formed, which contains only pixels of interest (31 to 34), and any relevant neighboring pixels. Because the pixel matrix 35 contains only a small fraction of the pixels contained in the image 36, SIMD-based processing may be efficiently accomplished.

Figure 8:
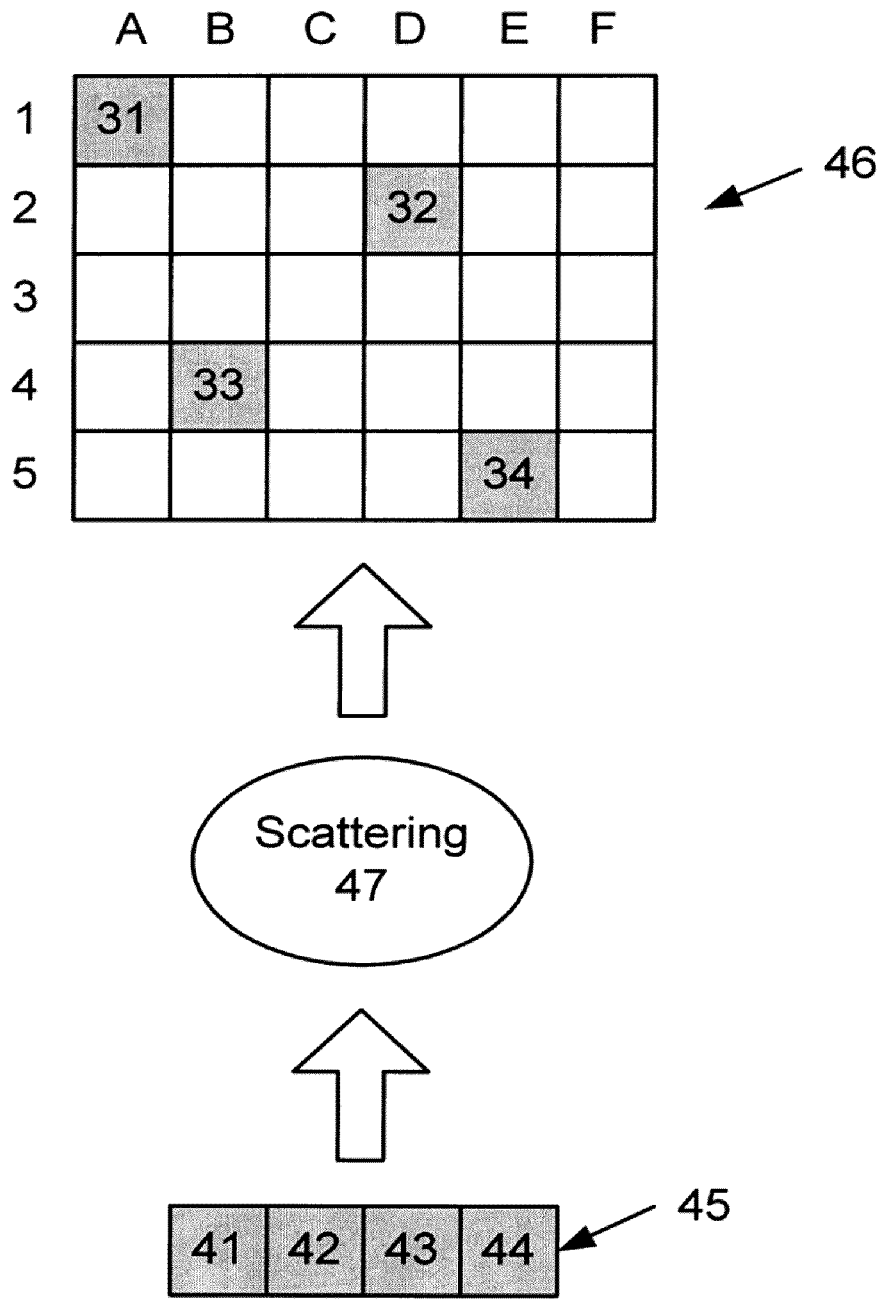
FIG. 8 is a diagram of pixel scattering according to an embodiment of the present disclosure.

Next, referring to FIG. 8, pixel scattering is described. During pixel scattering, processed pixels (41 to 44) contained in pixel matrix 45 are placed back into image 36 at their respective original locations (31 to 34). Therefore, scattering is the reverse process of gathering, and uses the same binary mask 23.

In another exemplary embodiment of the disclosure, it is preferred to have a DMA unit for use in the gathering and scattering phases. The DMA unit allows direct memory access, bypassing the data processor 1 and offloads some of the data processor's processing demands.

Figure 9:
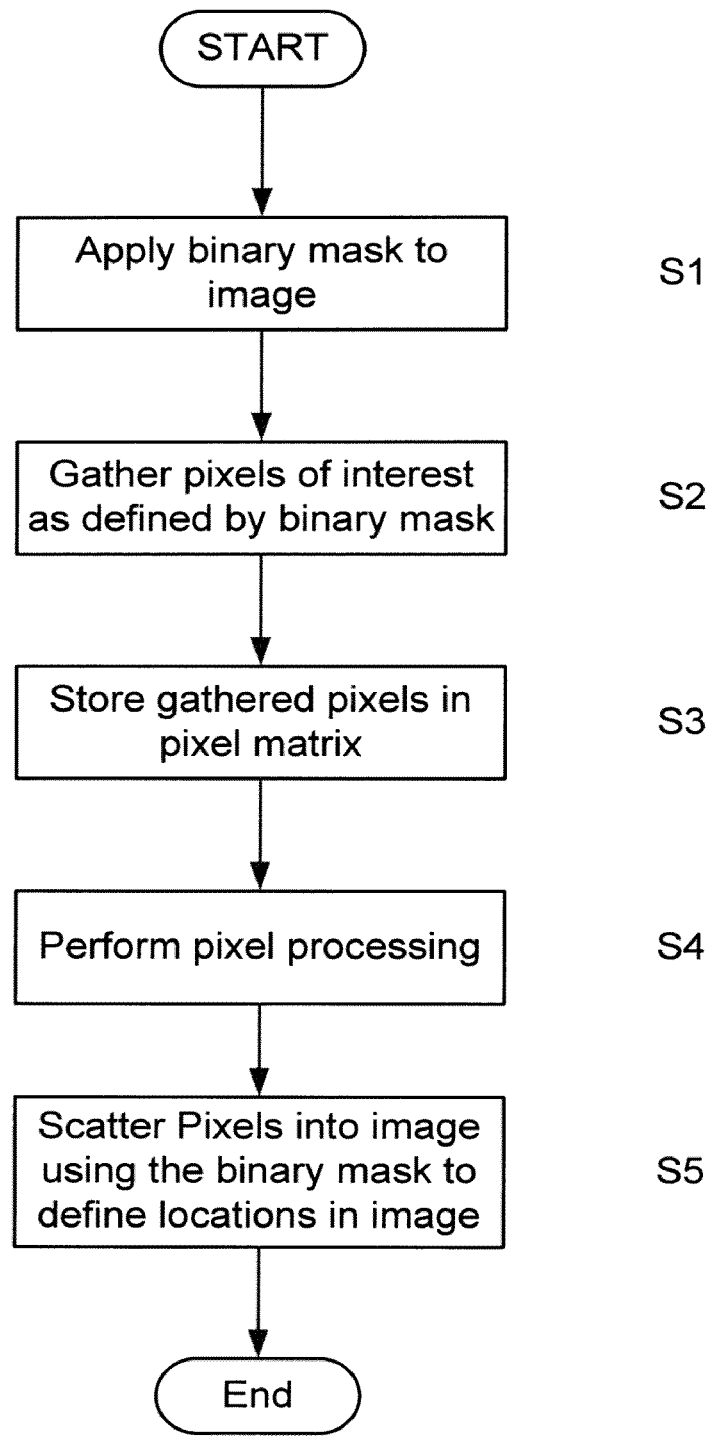
FIG. 9 is a flowchart of the video analytics method according to an exemplary embodiment of the present disclosure.

FIG. 9 is a flowchart summarizing the steps of the video analytics method according to an exemplary embodiment of the present disclosure. In step S1 the binary mask that defines the locations of pixels of interest is applied to the image. The identified pixels of interest are then gathered in step S2, and stored adjacent to one another in a pixel matrix during step S3. Then video analytics processing is performed on the pixel matrix at step S4. The video analytics processing may include processing the image using SIMD instructions. At step S5, the processed pixels are scattered back into the image using the binary mask to define their respective locations.

In another exemplary embodiment the above-described method is used to implement an N×N filter. The N×N filter kernel is applied to the pixel matrix 35 after the pixels of interest have been gathered in the gathering phase. This improves filtering efficiency because the filter operates only on the pixels of interest, and their respective neighbors, previously gathered into the pixel matrix, rather than the entire image. Once filtering is complete the pixels are scattered as described above.

Filtering efficiency may be further improved by implementing the filter using techniques that avoid the conventional way of performing convolutions between the filter kernel and pixel data. The intermediate result of a conventional convolution contains double the number of bits of the arguments to the convolution function. For example, an 8-bit convolution expands the data to 16 bits in an intermediate step. Using SIMD operations such as averaging instructions, splice instructions and linear interpolation instructions to implement a video analytics filter eliminates the need for performing convolutions and holds the number of bits per pixel constant throughout the filtering process. (See, for example, co-pending application Ser. No. 12/275,758.)

Next, a network camera that employs the above-described video analytics system and associated methodology is described with reference to FIG. 9. A network camera 70 (or an IP-camera) may be any digital camera capable of generating image sequences and communicating the image sequences or image data from the image sequences, such as image meta data, over a network to a user client.

Figure 10:
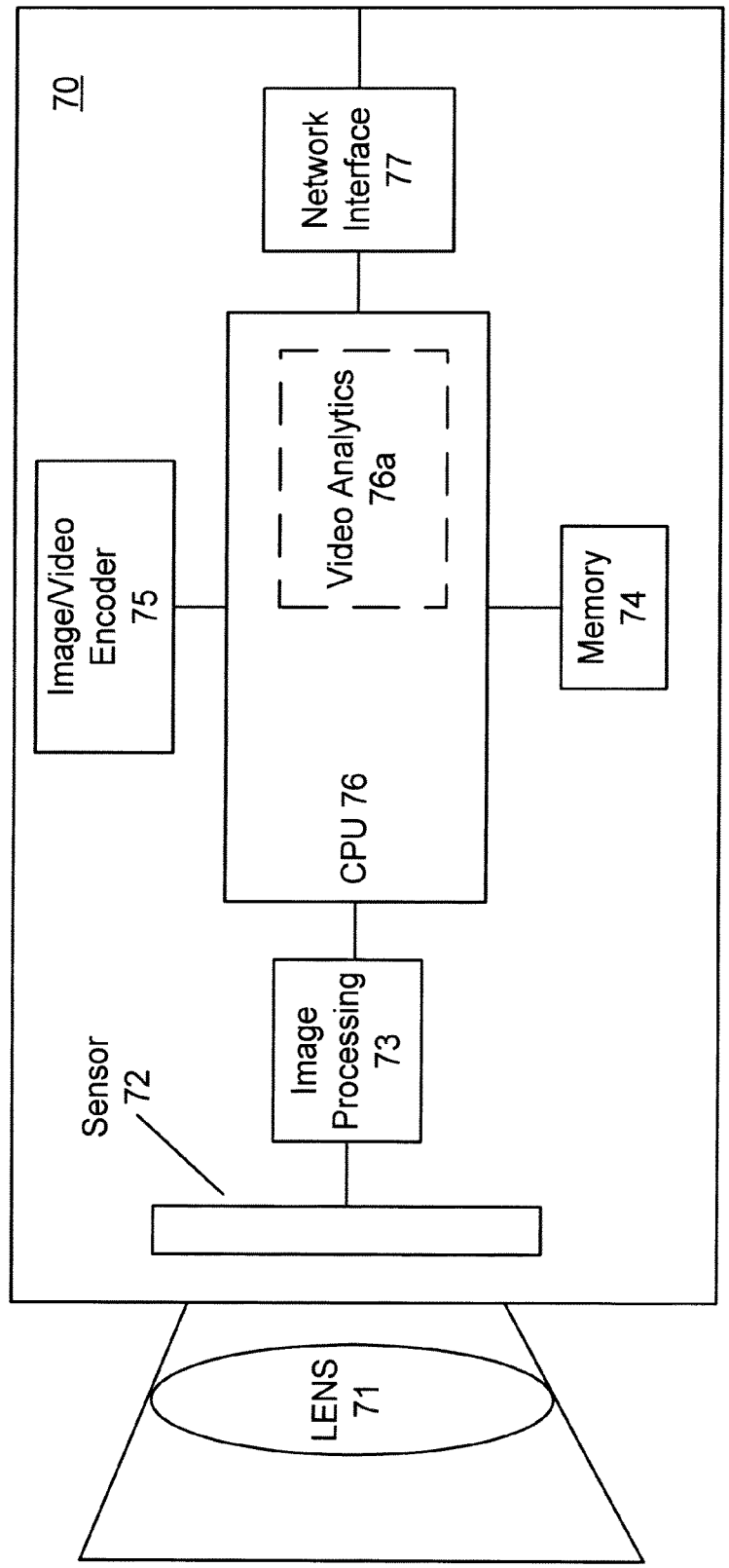
FIG. 10 is a diagram of a video surveillance system.

FIG. 10 is a network camera 70 with embedded video analytics. The network camera 70 includes a lens system 71 for collecting incident light, an image sensor (sensor) 72 for registering incident light, an image processor 73, a Central Processing Unit (CPU) 76 for managing camera functionality as well as video analytics processing 76a, an image/video encoder 75, a memory 74 and a network interface 77.

In the network camera 70, the sensor 72 can be, for example a Charged Coupled Device (CCD), a CMOS-sensor, or similar. The image/video encoder 75 encodes video in any known video/image encoding format such as MPEG 1, MPEG2, MPEG4, H.264, JPEG, M-JPEG, Bitmap, etc. The memory 74 stores image information, program instructions, etc., and the network interface 77 is used to transfer image information through a network, such as an IP network, and also to receive information from the network.

Further, the image processor 73, video analytics 76a, and image/video encoder 75 may be implemented as software instructions executed by the CPU 76 or may be implemented in hardware such as individual microprocessors, FPGA's, ASIC's and the like. The CPU 76 may also be implemented as a microprocessor with or without SIMD instruction capability, FPGA, ASIC and the like. The memory may be static or dynamic RAM, ROM, EPROM, EEPROM, FLASH and the like, and the lens system 71 may be permanently attached to the network camera 70 or may be removable.

While the above-described network camera 70 is described as a single unit, other implementations are possible. A system of an analog camera, capable of generating analog image sequences, and a converter, such as a video encoder or a video server, may also be a network camera. The converter in such a system transforms the analog image sequences from the analog camera to digital image sequences or image data, and provides the digital image sequences or image data to the network. The converter also performs the video/image encoding and local video analytics.

Other components of the network camera 70, such as electric motors used to focus the lens system 71, light metering, power supplies, etc., are known and therefore omitted for brevity. Further, other implementations are possible without departing from the scope of this disclosure. For example, the network camera 70 may be an infra-red camera or the network interface may be a wireless interface, and the like.

By performing video analytics locally, on the network camera, only relevant video data may be placed on the network, which is significantly less than the amount of video data placed on the network by conventional network cameras.

Figure 11:
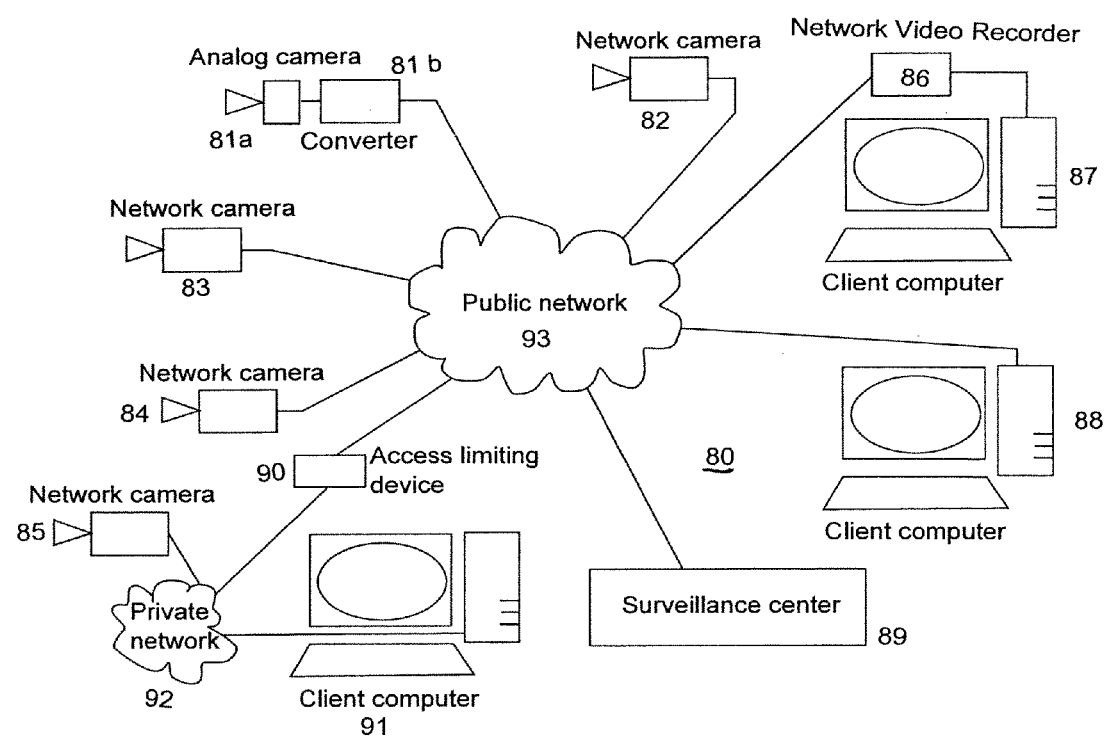
FIG. 11 is a diagram of a network camera according to an exemplary embodiment of the present disclosure.

FIG. 11 is a network camera system employing network cameras as described above. This exemplary network includes multiple network cameras (81-85) connected to a private network 92 or a public network 93. Network camera 81 includes an analog camera 81a and a converter 81b, while the network cameras (82-85) fully integrate all functionality, including video analytics.

The private network 92 may be a Local Area Network (LAN) or Wide Area Network (WAN) to which access is restricted. Further, the private network 92 may be connected to a public network 93 through an access limiting device 90 which may provide a firewall function, network address translation, etc. The access limiting device 90 may be a dedicated router, computer, server, etc. The public Network 93, for example the internet, may contain wireless and wired segments such as Wifi, Cellular networks, PSTN, ISDN, etc. The private network 92 may also include wireless and wired segments such as Wifi, Ethernet, etc.

Client computers (87, 88, 91), a surveillance center 89, and a Network Video Recorder 86 are connected to the network cameras (81-85) via the private or public networks (92 or 93 respectively). In the network camera system 80, the network interfaces of the network cameras (81-85) enable communication between the network cameras (81-85) and the client computers (87, 88, 91). Such communication includes the transfer of image data, audio data, control information (pan, tilt, zoom, etc), video settings, and the like. Further, the network cameras (81-85) may service more than one client, for example a surveillance center 89, client computers (87, 88, 91) or a server for storing images and relaying them to other clients (not shown).

In addition, the above described network camera may be used in a system as discussed in FIG. 3 of U.S. application Ser. No. 12/275,758, the entire contents of which are incorporated herein by reference.

Video analytics applications, such as motion detection, are based on analysis of images from the image sequences captured by the network cameras (81-85). As recognized by the present inventor, when the analysis of the images are performed on the network cameras themselves, data traffic on the public network 93 or private network 92 may be reduced. Only data pertaining to relevant events may be transmitted to the surveillance center 89 or the client computers (87, 88, 91), conserving bandwidth for other applications, reducing the amount of storage space required to store video information, and reducing the amount of video data to be subsequently searched.

Though motion detection is discussed in the above description, the system and associated methodology described herein is also suitable for other forms of video analytics, such as facial recognition, object recognition, background/foreground separation, pattern analysis, etc.

The foregoing discussion discloses merely exemplary embodiments of the present disclosure. As will be understood by those skilled in the art, the present advancement may be embodied in other specific forms without departing from the spirit or essential characteristics thereof. Accordingly, the disclosure of the present invention is intended to be illustrative, but not limiting of the scope of the advancement, as well as other claims. The disclosure, including any readily discernible variants of the teachings herein, define, in part, the scope of the foregoing terminology such that no inventive subject matter is dedicated to the public.

The invention claimed is:

1. A video analytics processing method comprising:
gathering, in a computer-readable storage medium, a plurality of pixels of interest from an image according to a predetermined binary mask, the predetermined binary mask defining at least one location of the plurality of pixels of interest on the image;
arranging the plurality of pixels of interest in a pixel matrix including at least the pixels of interest, each pixel of interest being stored in the pixel matrix adjacent to other pixels of interest;
performing video analytics processing on the pixel matrix, using SIMD instructions on a data processor; and
scattering the pixels of interest into the image after processing according to the predetermined binary mask, wherein the gathering step and the scattering step are performed independently of the performing video analytics processing step.

2. The video analytics method processing according to claim 1, wherein the gathering step includes for each pixel of interest,
dilating the predetermined binary mask by at least one pixel position in a horizontal direction,
gathering at least one neighboring pixel from a pixel row above the pixel of interest in accordance with the dilated binary mask,
gathering, in accordance with the dilated binary mask, at least one neighboring pixel and the pixel of interest from a pixel row of the pixel of interest, and
gathering at least one neighboring pixel from a pixel row below the pixels of interest in accordance with the dilated binary mask.

3. The video analytics method processing according to claim 2, wherein the gathering step and the scattering step further include using a DMA unit to respectively gather and scatter the plurality of pixels of interest and the neighboring pixels independently of the data processor.

4. The video analytics processing method according to claim 1, wherein performing video analytics processing includes filtering the pixels of interest with a N×N filter kernel using a SIMD instruction set, the SIMD instruction set including an averaging instruction, a halved subtraction instruction with biased result and a splice instruction.

5. The video analytics processing method according to claim 4, wherein a predetermined number of bits representing each pixel is held constant throughout the filtering operation.

6. A non-transitory computer-readable medium storing computer-readable instructions thereon, the instructions when executed by a processor cause the processor to perform the video analytics processing method comprising:
gathering, in a computer-readable storage medium, a plurality of pixels of interest from an image according to a predetermined binary mask, the predetermined binary mask defining at least one location of the plurality of pixels of interest on the image;
arranging the plurality of pixels of interest in a pixel matrix including at least the pixels of interest;
performing video analytics processing on the pixel matrix using a SIMD processor; and
scattering the pixels into the image after processing according to the predetermined binary mask, wherein
the gathering step and the scattering step are performed independently of the performing video analytics processing step.

7. The non-transitory computer-readable medium according to claim 6, wherein the gathering step includes for each pixel of interest,
dilating the predetermined binary mask by at least one pixel position in a horizontal direction,
gathering at least one neighboring pixel from a pixel row above the pixel of interest in accordance with the dilated binary mask,
gathering, in accordance with the dilated binary mask, at least one neighboring pixel and the pixel of interest from a pixel row of the pixel of interest, and
gathering at least one neighboring pixel from a pixel row below the pixels of interest in accordance with the dilated binary mask.

8. The non-transitory computer-readable medium according to claim 7, wherein the gathering step and the scattering step further include using a DMA unit to respectively gather and scatter the plurality of pixels of interest and the neighboring pixels independently of the data processor.

9. The non-transitory computer-readable medium according to claim 6, wherein performing video analytics processing includes filtering the pixels of interest with a N×N filter kernel using a SIMD instruction set, the SIMD instruction set including an averaging instruction, a halved subtraction instruction with biased result and a splice instruction.

10. The non-transitory computer-readable medium according to claim 9, wherein a predetermined number of bits representing each pixel is held constant throughout the filtering operation.

11. A network camera comprising:
at least one lens configured to collect incident light;
a sensor arranged behind the lens and configured to convert the incident light into image data;
an electronic memory configured to store, as image data, the electrical data corresponding to the image;
a video encoder configured to encode the image data;
a data processor including
a gathering unit configured to gather, in the electronic memory, a plurality of pixels of interest from an image according to a predetermined binary mask, the predetermined binary mask defining at least one location of the plurality of pixels of interest,
an arranging unit configured to arrange the plurality of pixels of interest in a pixel matrix including at least the pixels of interest, a video analytics unit configured to perform video analytics processing on the pixel matrix independently from the gathering unit,
a scattering unit configured to scatter the pixels of interest into the image, independently of the gathering unit and the video analytics unit; and
a network interface configured to connect to a data network.

12. The network camera according to claim 11, wherein the gathering unit is further configured to,
dilate the predetermined binary mask by at least one pixel position in a horizontal direction,
gather at least one neighboring pixel from a pixel row above the pixel of interest in accordance with the dilated binary mask,
gather, in accordance with the dilated binary mask, at least one neighboring pixel and the pixel of interest from a pixel row of the pixel of interest, and
gather at least one neighboring pixel from a pixel row below the pixels of interest in accordance with the dilated binary mask.

13. The network camera according to claim 11, further comprising:
a DMA unit configured to transport pixels independently of the data processor, the pixel gathering unit and the pixel scattering unit employing the DMA unit when respectively gathering and scattering pixels of interest.

14. The network camera according to claim 11, wherein the data processor is further configured to perform filtering of the pixels of interest with a N×N filter kernel using SIMD instructions, the SIMD instructions including an averaging instruction, a halved subtraction instruction with biased result, and a splice instruction.

15. The network camera according to claim 14, wherein a predetermined number of bits representing each pixel is held constant throughout the filtering operation.

* * * * *